United States Patent
Drooghaag et al.

(10) Patent No.: US 9,008,280 B2
(45) Date of Patent: Apr. 14, 2015

(54) METHOD AND TESTING SYSTEM FOR TESTING AN ANALOGUE FRONT END

(75) Inventors: Benoit Drooghaag, Ophain-Bois-Seigneur-Isaac (BE); Nicolas Dupuis, Chaudfontaine (BE)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/884,111

(22) PCT Filed: Nov. 30, 2011

(86) PCT No.: PCT/EP2011/071403
§ 371 (c)(1),
(2), (4) Date: May 8, 2013

(87) PCT Pub. No.: WO2012/076383
PCT Pub. Date: Jun. 14, 2012

(65) Prior Publication Data
US 2013/0243167 A1 Sep. 19, 2013

(30) Foreign Application Priority Data
Dec. 7, 2010 (EP) .................................... 10306363

(51) Int. Cl.
*H04M 3/22* (2006.01)
*H04M 3/30* (2006.01)
*H04M 11/06* (2006.01)

(52) U.S. Cl.
CPC ............ *H04M 3/2209* (2013.01); *H04M 3/306* (2013.01); *H04M 11/062* (2013.01)

(58) Field of Classification Search
None
See application file for complete search history.

(56) References Cited

U.S. PATENT DOCUMENTS

| 6,256,377 B1* | 7/2001 | Murphree et al. ............... 379/24 |
| 2002/0191552 A1* | 12/2002 | Watkinson ..................... 370/286 |
| 2004/0101130 A1* | 5/2004 | Shi et al. ................. 379/399.01 |
| 2009/0210554 A1* | 8/2009 | Schmitt et al. ................ 709/237 |
| 2009/0323902 A1 | 12/2009 | Dinesh et al. |
| 2011/0261932 A1 | 10/2011 | Berg et al. |

FOREIGN PATENT DOCUMENTS

| EP | 1819098 A1 | 8/2007 |
| JP | 09247102 | 9/1997 |

(Continued)

OTHER PUBLICATIONS

PCT/ISA/210 International Search Report for PCT/EP2011/071403 dated Nov. 30, 2011.

(Continued)

*Primary Examiner* — Duc Nguyen
*Assistant Examiner* — Assad Mohammed
(74) *Attorney, Agent, or Firm* — Harness, Dickey & Pierce

(57) ABSTRACT

Method for testing an analog front end coupled to a telecommunication line of a telecommunication system and a related testing system is described. The testing system comprises a single ended line testing measurement module for applying single ended line testing measurements via said analog front-end upon said line and for collecting thereby single ended line testing measurements; and a processing means for interpreting the single ended line testing measurements and for thereby judging that the analog front end being out of order and a control means for controlling the single ended line testing measurement module and processing means.

10 Claims, 2 Drawing Sheets

(56) References Cited

FOREIGN PATENT DOCUMENTS

| | | | |
|---|---|---|---|
| JP | 2005333222 | A | 12/2005 |
| JP | 2009027435 | A | 2/2009 |
| WO | WO-2010064977 | A1 | 6/2010 |

OTHER PUBLICATIONS

Japanese Notice of Rejection dated Aug. 5, 2014 for related Japanese Application No. 2013-542464 (full translation provided).

* cited by examiner

METHOD AND TESTING SYSTEM FOR TESTING AN ANALOGUE FRONT END

The present invention relates to a method and testing system for testing an analogue front end being coupled to a telecommunication line in a telecommunication system.

In telecommunication systems such as in a Digital Subscriber Line telecommunication system, a big part of the electronics is made of digital circuitry dedicated to the higher layer protocols. However, for the physical layer, next to the digital signal processor unit, there are still a number of analogue components that are used to actually make the conversion between the digital signals and the analogue signals in order to amplify or to filter the analogue signals that are sent and received on the telecommunication line coupled thereto. Such a typical Digital Subscriber Line system comprises in its analogue front end typical components such as:

- a Digital to Analogue Converter DAC that converts the digital signal coming from the Digital Signal Processor into an analogue signal i.e. voltage signal; and
- a Line Driver LD that amplifies the signal coming from the Digital Analogue Converter DAC before sending it to the telecommunication line; and
- a Hybrid Hyb that separates the sent signals from the received signals; and
- a High-pass-filter HPF that prevents interaction between the xDSL signal and telephone signals; and
- a Low-Noise-Amplifier LNA that amplifies the signal received from the telecommunication line; and
- an anti-aliasing filter, which is a low-pass filter LPF that prevents aliasing of out-of-band signal; and
- an analogue to digital converter ADC that converts the received analogue signal into a digital signal to feed the Digital Signal Processor DSP.

A hardware failure in any of those analogue components, which is often due to lightning, will make the analogue front end system out of service.

Figure 1:
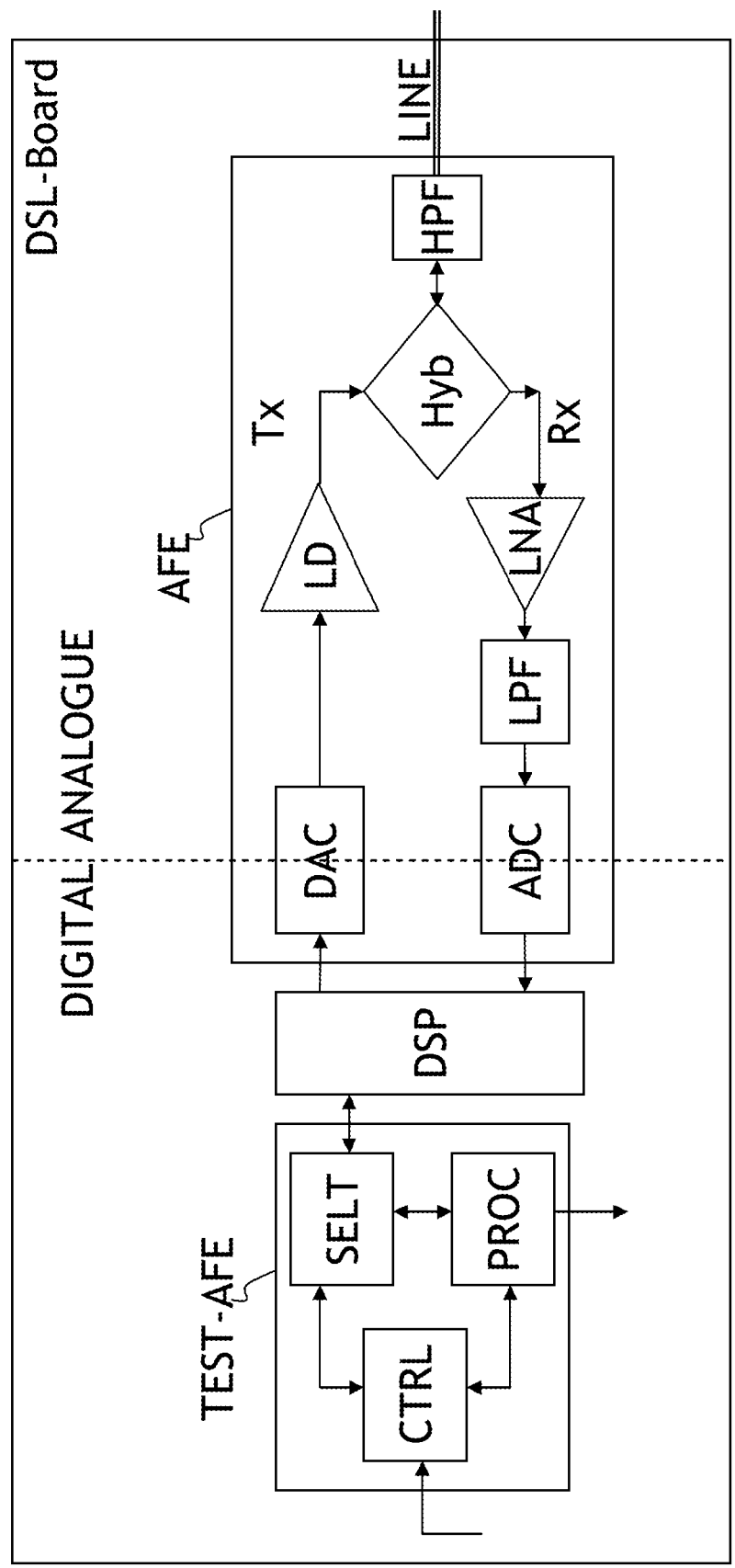
FIG. 1 is a diagram illustrating a testing device for an analogue front end, according to at least one example embodiment.

Unlike for a failure of any other digital block in the system such as the Digital Signals Processor or any other higher-layer digital process, the out of service of the analogue front end can not be detected via software.

Up to now, when a customer complains about his telecommunication line and if a failure in the analogue-front-end would be suspected, the only way to verify this, is to manually rewire the telecommunication line of this customer to another port of the DSL board or even to rewire this line to another board, in order to check whether the line would come back into service. If the line comes back into service after rewiring then the problem was indeed due to a failure in the front-end of the former DSL port. However, in the event when after rewiring, the line is not coming back into service, the problem is suspected to be on the telecommunication line itself. This rewiring technique requires a manual intervention of an operator, and is therefore time consuming and costly. Indeed, a manual rewiring intervention can take hours due to the time required to dispatch a field technician to the right central office or remote unit, and to actually rewire the line to another port and check if the service is restored correctly.

An object of the present invention is to provide a method and testing system for testing an analogue front end being coupled to a telecommunication line in a telecommunication system such as the above known type of testing but without the above mentioned drawbacks.

According to the invention, this object is achieved due to the fact that the testing system comprises a single ended line testing measurement module for applying single ended line testing measurements via the analogue front-end of the telecommunication line and collecting thereby single ended line testing measurements; and a processing means for interpreting the single ended line testing measurements and thereby judging that the analogue front end is out of order; and a control means for controlling the single ended line testing measurement module and the processing means.

The basic idea of the present application is the use reflectometry measurements for detecting a hardware failure in the analogue front end.

Reflectometry or also called Single Ended Line Testing SELT is a technique already known and used in xDSL systems.

Single ended line testing is a method to identify impairments in telecommunication lines of a binder and comprises a step of performing Single Ended Line Testing SELT on the different lines of a bundle.

A well known technique of single ended line testing is called Time Domain Reflectometry TDR. TDR consists in sending a signal over a twisted pair and in measuring the received echo over the time. An input signal, also called incident signal, is applied to a telecommunication line via the transmit input and an echo signal is measured via the receive output. The obtained measurements are called reflectogram. At any, even light, impedance change of the line, the reflected echo level will vary, which will appear as a 'peak' or a 'valley' in the echo measurement. When using this technique, any impairment such as bad contact, a bridge tap or wire gauge change will become visible in the reflectogram.

Another known single ended line testing method is called Frequency Domain Reflectometry FDR. This technique consists in measuring the amplitude and the phase of the echo signal in function of the frequency. Practically, the echo can be measured separately for each required frequency, called frequency sweep, or for all the frequencies at a time whereby the emitted signal is a broadband signal. The resulting plot is a bode diagram of the reflection coefficient with amplitude and phase versus frequency. Such a diagram is rather complex to interpret since a single impairment will appear as a series of regularly-spaced bumps or holes in the echo amplitude.

For both time-domain and frequency-domain reflectometry, the result is affected by impairments such as bad contact or water in the cable but also by so called normal imperfection like wire gauge changes or bridged tap. Based on these techniques it is known to measure the loop length, to determine the loop termination or to detect other impairments like bridge-taps.

The principle of the present application is to send a signal on the telecommunication line and to observe the reflection of the signal that comes back from the line i.e. to observe the echo. In the event when a reflectometry measurement is performed on a telecommunication line that is connected to an xDSL port whose analogue-front-end is broken, the observed measurement is in fact not an echo coming back from the telecommunication line, but the observed measurement will be very close to the background noise of the environment.

So, if a reflectometry measure contains no echo signal but only a very low noise, there is a probability that the incident signal was never sent on the line which might be an indication that the failure is located in the transmit part of the analogue front end; or there is a probability that the incident signal could not be measured correctly which might be an indication that the failure is located in the receive part of the analogue front end.

As such, the acquired information from the single ended line testing measurements is used to diagnose a potential hardware failure in the analogue circuitry of the port.

The value of the present application is fact that a broken analogue front end is automatically detected, without the need for manual intervention. This brings time and cost advantages to the operator who is maintaining the network, and it is therefore very valuable to integrate this feature in a diagnosis tool of the telecommunication network. Indeed, as mentioned above, while the manual rewiring intervention can take hours, a reflectometry measurement and an automatic processing and interpretation of the test results take less than one minute. It is even more valuable in an unbundled scenario, where the different wires and the xDSL board do not belong to the same company. It is indeed then crucial to determine whether the fault is on the board or on the line itself, since it implies the responsibility of two different companies.

A preferred implementation of the present application is that the single ended line testing measurement module performs a Frequency Domain Reflectometry FDR and that hereby the line testing measurements are signal power spectral densities.

Another characteristic feature of such FDR implementation is that the processing means is further comprised for comparing predefined calibration curves with a plot of the signal power spectral densities. Such so-called "calibration curves" are always performed at design time or initialization time of the single ended line testing module since they are required for correct interpretation of the results. There are typically three kinds of calibration measurements performed. A first one is performed on an open circuit, a second one is performed on a short circuit and a third one is performed on a matched impedance which is typically 100 Ohms in a Digital Subscriber Line system. These calibration measurements are performed at design time of the DSL board but can be repeated for each DSL board that comes out of the production line for more accuracy. In this way the calibration curves are known at the time when a DSL board is brought in deployment in the field.

Another way of determining anomalies in the single ended line testing measurements with a view on potentially detecting a broken analogue front end is that the processing means is further comprised in the testing system for determining a total power for the received spectral densities and for comparing the total power to a predetermined threshold. Hereby the processing means is designed to judge that the analogue front end is out of order in the event when the total power is below the predetermined threshold.

Furthermore, the testing system of the present application can be coupled to a plurality of telecommunication lines and becomes thereby enabled to test each one of the respective analogue front ends that is coupled between the testing system and one of the plurality of telecommunication lines i.e. with one testing system different analogue front ends can be tested upon its proper working. It has to be remarked that the different lines can all be coupled to one and the same board but might as well be coupled to different boards, whereby one testing system serves also different boards.

The testing system can be at least partly comprised in an access node or can be at least partly comprised in a network diagnosis tool. This means that possible implementations of the present application comprises embodiments whereby the testing system is completely implemented in a DSL board or completely implemented in a diagnosis tool.

Finally, the different function blocks of the testing system can be centralized in one and the same network element but might as well be distributed over different network elements such as an access node and/or a diagnosis tool.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Figure 2:
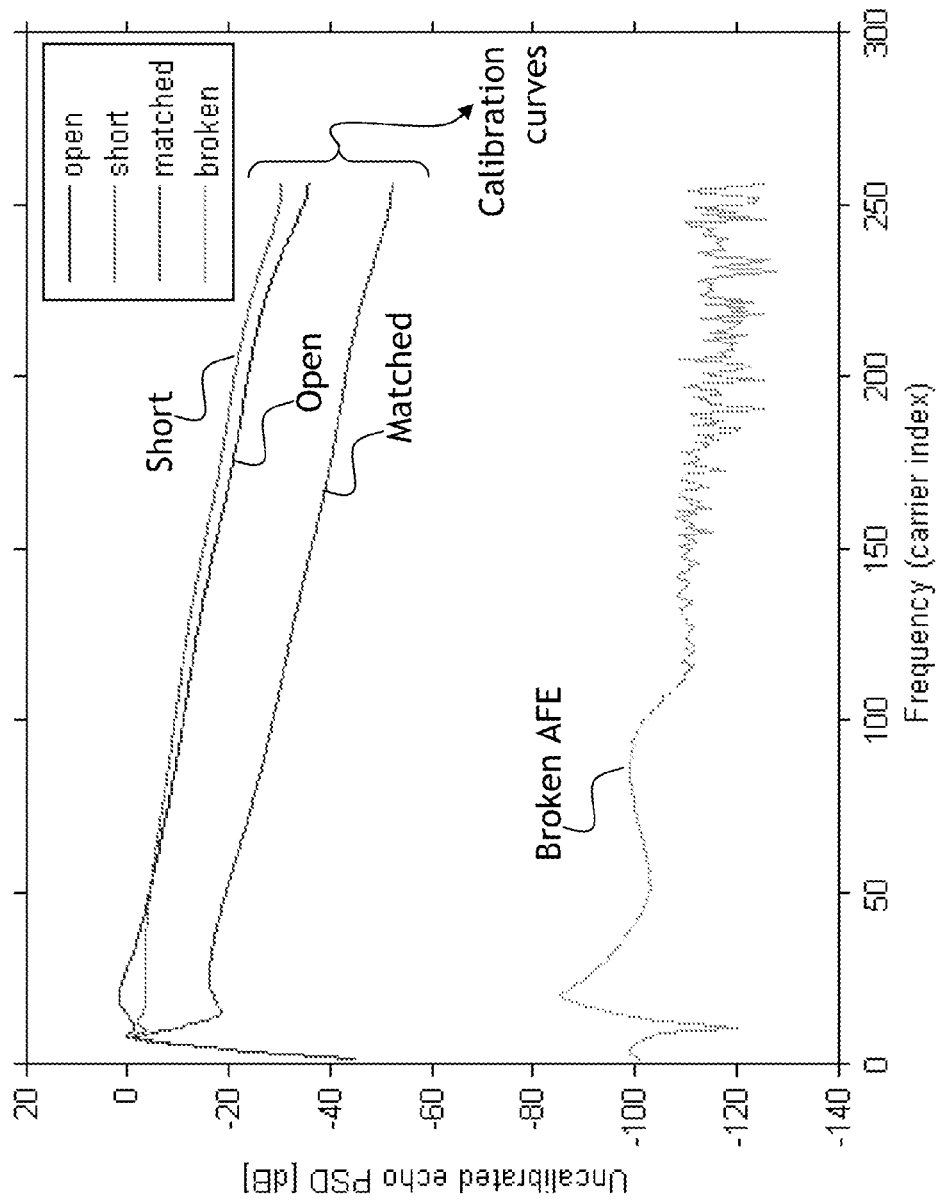
FIG. 2 is a graph illustrating a signal power spectral density with respect to frequency, according to at least one example embodiment.

The above and other objects and features of the invention will become more apparent and the invention itself will be best understood by referring to the following description of an embodiment taken in conjunction with the accompanying drawings wherein FIG. 1 represents a Digital Subscriber Line board DSL-Board and FIG. 2 Shows on a diagram a comparison of reflectometry measurements with calibration curves for open, short and matched terminations.

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In addition, the principle working of the method for testing an analogue front end will be described in further detail.

Referring to FIG. 1, one port of a DSL Board is shown. The DSL port comprises a digital part DIGITAL and an analogue part ANALOGUE. The border between both parts is formed by means of a digital to analogue converter DAC and an analogue to digital converter ADC. The analogue part comprises the analogue front end AFE with the following components, coupled to each other in sequence of being mentioned:

the Digital to Analogue Converter DAC that converts the digital signal coming from the Digital Signal Processor into an analogue signal i.e. voltage signal; and a Line Driver LD that amplifies the signal coming from the Digital Analogue Converter DAC before sending it to the telecommunication line; and a Hybrid Hyb that separates the sent signals from the received signals; and a High-pass-filter HPF that prevents interaction between the xDSL signal and telephone signals; and a Low-Noise-Amplifier LNA that amplifies the signal received from the telecommunication line; and an anti-aliasing filter, which is a low-pass filter LPF that prevents aliasing of out-of-band signal; and an analogue to digital converter ADC that converts the received analogue signal into a digital signal to feed the Digital Signal Processor DSP.

It has to be remarked that some of these functions can be integrated in one single chip but not all of them, since they require other technologies or are just bigger components like inductors, transformers or big capacitors. In this way the Digital to Analogue Converter can be integrated with the Analogue to Digital Converter, but the Line Driver is difficult to be further integrated with another component since it requires a power semiconductor technology and also the filters that require big capacitors are difficult to be further integrated with other components.

The High-pass-filter HPF is coupled to the telecommunication line LINE which on its turn is coupled to a customer premises equipment CPE.

The Digital part comprises a Digital Signal Processor DSP, which is coupled to both, the Digital to Analogue converter DAC and the Analogue to Digital converter ADC; and the testing system TEST-AFE of to the present application.

The testing system TEST-AFE comprises a single ended line testing measurement module SELT, a processing means called processer PROC and a control means called controller CTRL. The single ended line testing module SELT is coupled to the digital signal Processor DSP, to the processor PROC and to the controller CTRL. The controller is also coupled to the processor.

The single ended line testing measurement module SELT is included in the testing system for applying single ended line testing measurements via the analogue front-end upon the line LINE and for collecting thereby single ended line testing measurements. The processor PROC is included in the testing system TES-AFE for interpreting the single ended line testing measurements and for thereby judging that the analogue front end AFE is out of order or not. The controller CTRL is included in the testing system TEST-AFE for controlling the single ended line testing measurement module SELT and the processor PROC.

Presume a situation wherein a customer complains about his telecommunication line such as e.g. LINE. The method of the present application provides a way to verify whether the failure in the analogue-front-end could be suspected. The operator can trigger in such a situation the controller CTRL who will control on its turn the single ended line testing measurement module and the processor.

A first control signal is forwarded to the single ended line testing measurement module in order to trigger this module to apply a single ended line testing measurement via the analogue front-end of the respective line LINE and to collect thereby single ended line testing measurements.

The collected single ended line testing measurements are forwarded by the measurement module SELT to the processor PROC of the testing system.

Upon reception of the measurements, the processor PROC starts interpreting the single ended line testing measurements and decides thereby whether the complaints about the telecommunication line LINE are due to the associated analogue front end being out of order.

It has to be remarked that an alternative way to control by means of the controller CTRL both, the single ended line testing measurement module SELT and the processor PROC, is provided when e.g. the measurement module SELT performs e.g. upon a regular way the single ended line measurements and provides hereby the collected measurements in a regular way to the processor. In the event when the operator initiates the controller CTRL, the controller sends a second control signal to the processor PROC in order to trigger the execution of the interpretation of the e.g. recently received measurements and the decision. The aim is in fact that via the controller CTRL an outside event is forwarded to both devices SELT and PROC in order to execute its functionality.

It has to be noted that in e.g. xDSL systems typically Frequency-Domain Reflectometry FDR is used as single ended line testing measurement. When applying FDR a typical plot that reflects the measurements shows actually the power of the received signal in function of the frequency i.e. the received signal power spectral density PSD.

It is noted that the received signal i.e. received by the SELT module might be or might not be an echoed signal. This depends whether the analogue front end is indeed broken or not and if it is broken it depends as well of the respective component that is broken.

As explained above, calibration curves are always generated at design time or initialization time of the single ended line testing module SELT since they are required for correct interpretation of the results. These calibration curves are shown in FIG. 2. The typical three kinds of calibration measurements that are generated at design time are performed:

on an open circuit; and
    on a short circuit; and
    on a matched impedance which is typically 100 Ohms in a
        Digital Subscriber Line system.

According to classical transmission line theory, the maximum measured signal of an echo signal happens when the port is terminated by an open or short-circuit. This is shown in FIG. 2 i.e. the highest curves. In these cases, all the signal power is coming back to the emitter. Furthermore, the minimum measured signal of an echo signal happens when the port is terminated, also called loaded, by a matched impedance. The impedance is in fact equal to the internal source impedance of the port of the line LINE. In this case, see FIG. 2, all the signal power is transmitted to the load and no signal power comes back.

The task of interpretation of the processor PROC will now be described in more details. In the event of an xDSL telecommunication system where the single ended line testing SELT is provided by performing FDR and whereby a signal power spectral density is measured and provided in a plot, the step of interpreting comprises comparing these predefined calibration curves with a plot of the measured signal power spectral densities. FIG. 2 shows the measured signal power spectral density for a broke analogue front end system. The shown "echo" level of the broken port is much lower than anyone of the calibration curves which were generated for a healthy port. Even when the port is loaded by a matched impedance, the generated plot with a broken analogue front end is much lower. The interpretation of the processor PROC consist of determining whether the actual measurements of the SELT are indeed located much lower in the diagram or not when being compared to the calibration curves. In the event when the actual measurements are indeed much lower, the processor PROC judges/determines that the analogue front end is indeed out of order.

An additional or alternative step of "interpreting" comprises determining a total power for the received spectral densities and comparing this total power to a predetermined threshold. The total power of a spectral density signal can be determined by integrating the received PSD signal over the frequency.

Indeed, at design time of the SELT module, the total power for e.g. the matched impedance calibration curve can be determined. The value of the calculated power is defined as a Threshold value which is for instance stored in the processor PROC. At the time of challenging the proper working of the analogue front end, the processor PROC calculates, based upon recent SELT measurements, the total power for the received spectral density and compares this value to the predetermined threshold value. In the event when the total power of the received spectral density is lower as the predetermined threshold value, the processor PROC judges that the analogue front end is indeed out of order.

Finally it has to be remarked that FIG. 1 shows that the testing system is coupled to only one telecommunication line LINE. However, the present testing system TEST-AFE can as well be coupled and serve for a plurality of similar telecommunication lines, each with its analogue front end.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for testing an analogue front end coupled to a telecommunication line of a telecommunication system, said method comprising:
   applying a single ended line testing measurement via said analogue front-end of said line and collecting thereby single ended line testing measurements; and
   interpreting said single ended line testing measurements and determining whether said analogue front end is out of order;
   wherein the interpreting comprises determining a total power for the received spectral densities, comparing the total power to a threshold, and determining that the analogue front end is out of order when the total power is below the threshold.

2. The method of claim 1, wherein said single ended line testing measurement is a Frequency Domain Reflectometry, and said line testing measurements are signal power spectral densities.

3. The method of claim 2, wherein said step of interpreting comprises comparing predefined calibration curves with a plot of said signal power spectral densities.

4. A testing system for testing an analogue front end coupled to a telecommunication line of a telecommunication system, the testing system comprising:
   a single ended line testing measurement module for applying single ended line testing measurements via said analogue front-end of said telecommunication line and collecting single ended line testing measurements;
   a processing means for interpreting said single ended line testing measurements and determining whether said analogue front end is out of order; and
   a control means for controlling said single ended line testing measurement module and processing means;
   wherein the processing means is further configured to determine a total power for the received spectral densities, to compare the total power to a threshold, and to determine that the analogue front end is out of order when the total power is below the threshold.

5. The testing system of claim 4, wherein said single ended line testing measurement module is configured to perform a Frequency Domain Reflectometry, and said line testing measurements are signal power spectral densities.

6. The testing system of claim 5, wherein said processing means are configured to compare predefined calibration curves with a plot of said signal power spectral densities.

7. The testing system of claim 4, wherein said testing system is coupled to a plurality of telecommunication lines and is enabled for testing a respective analogue front end being coupled to one of said plurality of telecommunication lines.

8. The testing system of claim 4, wherein said testing system is distributed over different network elements.

9. The testing system of claim 4, wherein said testing system is at least partly comprised in an access node.

10. The testing system of claim 4, wherein said testing system is at least partly comprised in a network diagnosis tool.

* * * * *